（12) United States Patent
Yoshida (10) Patent No.: US 6,484,848 B2
(45) Date of Patent: Nov. 26, 2002

(54) CONTINUOUS ROTARY ACTUATOR USING SHAPE MEMORY ALLOY

(75) Inventor: Eiichi Yoshida, Tokyo (JP)

(73) Assignee: Agency of Industrial Science and Technology, Tokyo (JP)

( * ) Notice: Subject to any disclaimer, the term of this patent is extended or adjusted under 35 U.S.C. 154(b) by 35 days.

(21) Appl. No.: 09/749,897

(22) Filed: Dec. 29, 2000

(65) Prior Publication Data

US 2002/0046622 A1 Apr. 25, 2002

(30) Foreign Application Priority Data

Apr. 20, 2000 (JP) ........................................ 2000-119794

(51) Int. Cl.$^7$ ................................................ F03G 1/00
(52) U.S. Cl. ........................................... 185/37; 60/529
(58) Field of Search ....................... 185/37, 45, DIG. 1; 60/528, 529

(56) References Cited

U.S. PATENT DOCUMENTS 3,720,107 A * 3/1973 Shepard ...................... 73/363.7
5,396,769 A * 3/1995 Brudnicki ...................... 60/528
6,129,181 A * 10/2000 Weems ........................ 185/37
6,235,211 B1 * 5/2001 Silverbrook .................. 216/27
6,257,705 B1 * 7/2001 Silverbrook .................. 347/54

FOREIGN PATENT DOCUMENTS

JP 7-103129 * 4/1995

* cited by examiner

Primary Examiner—David Fenstermacher
(74) Attorney, Agent, or Firm—Oblon, Spivak, McClelland, Maier & Neustadt, P.C.

(57) ABSTRACT

A continuous rotary actuator using a shape memory alloy has a simple structure, is small and light-weight, and has a high torque, which can lock the actuator against rotation during periods when the actuator is not energized. The continuous rotary actuator includes an inner drum rotating around an axis constituted by a rotating shaft. The inner drum is provided in an outer cylinder, wherein first and second shape memory alloy torsion springs, which are wound in opposite directions and which are unwound to recoil when electrically heated, are fixed between the outer cylinder and the inner drum, and wherein switching means for alternately switching the electrical heating according to the rotation angle of the inner drum are connected to the first and second shape memory alloy torsion springs.

11 Claims, 6 Drawing Sheets

[DURING ORDINARY OPERATION]

FIG. 2B

[DURING COUNTERCLOCKWISE ROTATION]

FIG. 2C

[DURING CLOCKWISE ROTATION]

⟨IN A NON-HEATED STATE:FIXED⟩

FIG. 4B

⟨INNER SPRING IS HEATED⟩

FIG. 4C

⟨OUTER SPRING IS HEATED⟩

CONTINUOUS ROTARY ACTUATOR USING SHAPE MEMORY ALLOY

TECHNICAL FIELD OF THE INVENTION

The present invention relates to an actuator which uses a shape memory alloy and which is capable of performing a continuous rotational motion in the forward and reverse directions.

DESCRIPTION OF THE RELATED ART

Conventionally, as a continuous rotary actuator, an electromagnetic motor and a motor for using an effect of recovering to the original shape, namely, a shape memory effect of a shape memory alloy (SMA), as rotation torque are well known.

The above-mentioned electromagnetic motor has problems in that the weight is too large to minimize because a coil is used, and if minimized, the coil becomes small and thus has a decreased output (torque).

On the other hand, the motor using the shape memory alloy has problems in that the motor needs a complicated switching circuit for the driving system, so that it is difficult to realize a small and lightweight motor and the rotation cannot be locked when it is not energized.

DISCLOSURE OF THE INVENTION

The present invention has been made in consideration of the above-described problems and an object of the invention is to provide a continuous rotary actuator using a shape memory alloy, which has a simple structure, being small and lightweight, which has a high torque, and in which the rotation can be locked in a non-energized state.

It is another object of the present invention to provide a continuous rotary actuator using a shape memory alloy, in which continuous rotation in the forward and reverse directions is possible.

The above and other objects and new features of the present invention will be apparent by the description of the specification and the appended drawings.

In order to achieve the above objects, the continuous rotary actuator using the shape memory alloy according to the present invention is characterized by comprising: an inner drum in an outer cylinder, the inner drum rotating around the axis as a rotating shaft, wherein both ends of a first and second shape-memory-alloy torsion springs are attached to a pair of movable contact members disposed between the outer cylinder and the inner drum, wherein one of the torsion springs are unwound to recoil by electrical heating of one of the torsion springs and another torsion spring is wound accordingly in the opposite direction, and wherein the movable contact members can be freely engaged with the outer cylinder and the inner drum via engaging means in which when one of the movable contact members is engaged with the outer cylinder, another is engaged with the inner drum; and switching means for alternately switching the electrical heating of the first and second shape-memory-alloy torsion springs according to the rotation of the inner drum, thereby continuously rotating the inner drum in one direction. A plurality of pairs of the first and second shape-memory-alloy torsion springs can be used.

In the continuous rotary actuator, the outer cylinder and the inner drum are connected to power supplies each having different polarity, and the switching means may be a one such that the movable contact members engaged with the outer cylinder and the inner drum can selectively energize the first and second shape-memory-alloy torsion springs according to its engaging state. In addition, the switching means has a movable cylinder constructing the movable contact member, wherein the movable cylinder encloses a pair of shape-memory-alloy coil springs in a manner so as to transform one coil according to the recoil of the other due to the electrical heating, and also which has contacts for applying current to the coil springs necessary for rotating the inner drum by coming into contact with conductive bars at the engaging positions of the outer cylinder and the inner drum.

Furthermore, the continuous rotary actuator has concave portions with which the movable cylinders are removably engaged in a manner so as to face each other at equally spaced positions of the inner periphery of the outer cylinder and the outer periphery of the inner drum. In addition, diodes each having a different directional characteristic are connected to the energizing system of the first and second SMA torsion springs, thereby enabling either one of the SMA torsion springs to be energized depending on the polarity of the power supply connected via the movable contact member.

The inner drum is formed by joining different directional ratchet gears and may be provided with two-way ratchets engaging with the concave portions between the teeth of the ratchet gears.

In the continuous rotary actuator according to the present invention, the first or second SMA torsion spring is electrically heated in a state in which one of the movable contact members is engaged with the outer cylinder and another is engaged with the inner drum, and when the engaging state of the movable contact members is changed, at the same time the appropriate SMA torsion spring is electrically heated, and as a result, the inner drum can be continuously rotated.

DESCRIPTION OF THE EMBODIMENTS

Figure 1:
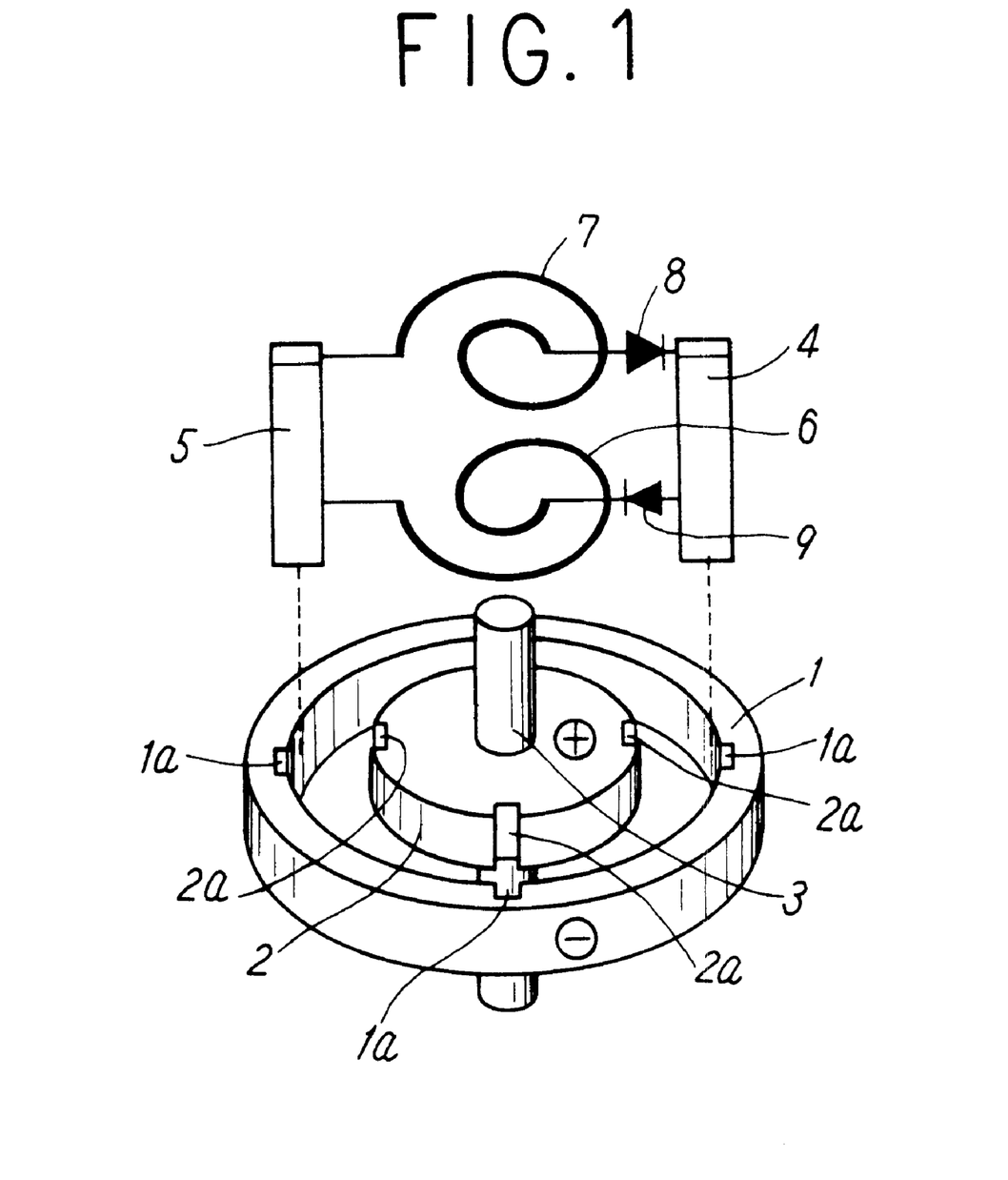
FIG. 1 is a structural view showing the basic structure of an embodiment of a continuous rotary actuator according to the present invention.
Figure 2A:
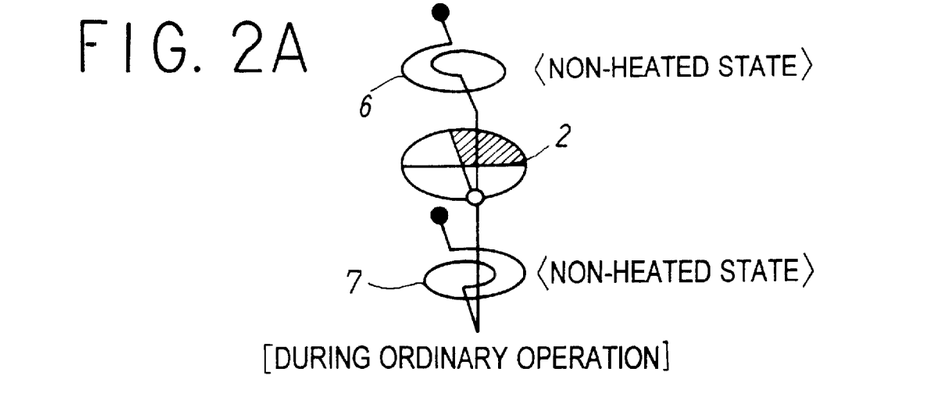
FIG. 2a is an explanatory view showing a non-driving state of the continuous rotary actuator of the embodiment according to the present invention and FIG. 2b is a driving principal view of the continuous rotary actuator when rotating clockwise.
Figure 2B:
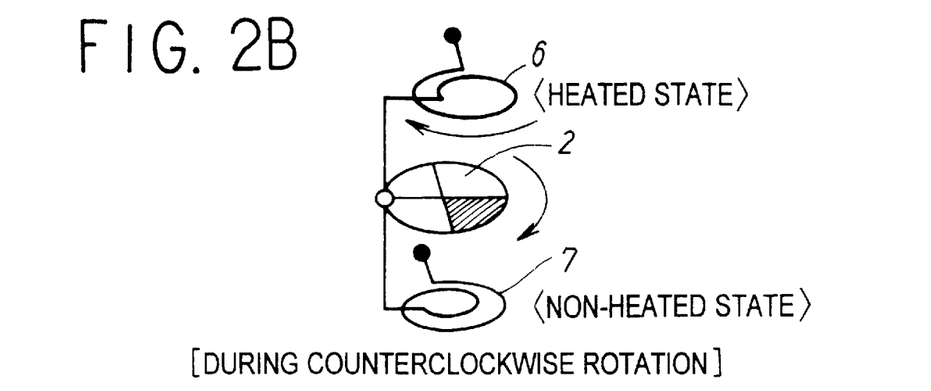
Figure 2C:
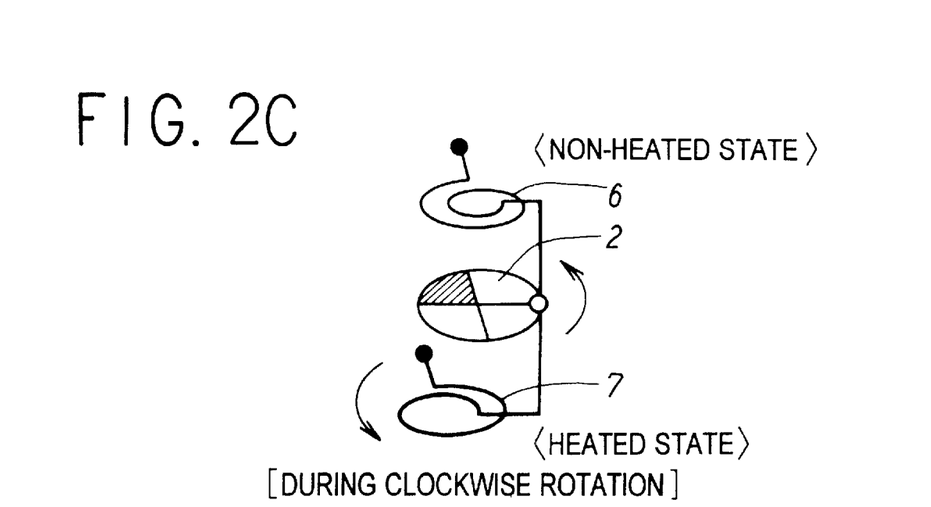
FIG. 2c is a driving principal view of the continuous rotary actuator when rotating counterclockwise.
Figure 3:
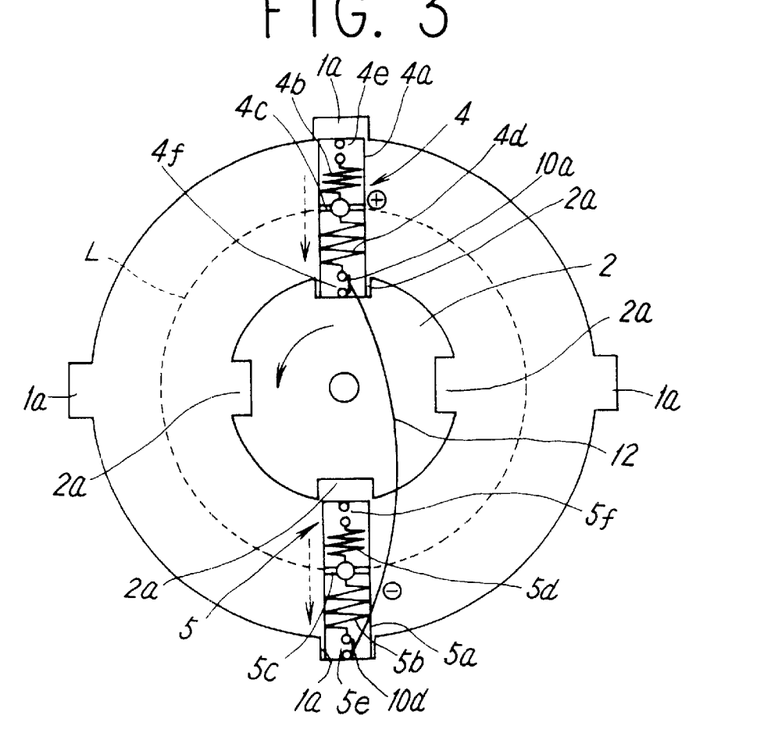
FIG. 3 is an explanatory view showing movable contact members of the continuous rotary actuator using the shape memory alloy of the embodiment according to the present invention.

A continuous rotary actuator shown in FIGS. 1 to 3 has an inner drum 2 in an outer cylinder 1 that is fixedly mounted, the inner drum rotating around the central axis of the outer cylinder 1 as a rotating shaft 3. One ends of each of first and second SMA torsion springs 6 and 7 exhibiting a shape memory effect are detachably fixed to the outer cylinder 1 or the inner drum 2 via movable contact members 4 and 5 that will be described in detail later, and the other ends are each detachably fixed to the outer cylinder 1 or the inner drum 2 via movable contact members 4 and 5. The movable contact members 4 and 5 have engaging means in which when either one of the movable contact members is engaged with the outer cylinder 1, the other is engaged with the inner drum 2. The outer cylinder 1 and the inner drum 2 are each connected to a different electrode of a driving power supply. Here, a case where the outer cylinder 1 is connected to a cathode and the inner drum 2 is connected to an anode is shown. When either one of the movable contact members 4 and 5 is engaged with the outer cylinder 1, the SMA torsion spring 6 or 7 fixed to the outer cylinder 1 via the movable contact member is connected to the cathode, and the SMA torsion spring 6 or 7 fixed to the inner drum 2 via another movable contact member is connected to the anode.

In addition, in the energizing systems of the first SMA torsion spring 6 and the second SMA torsion spring 7, a first diode 8 and a second diode 9 each having a different directional characteristic are connected in parallel between the movable contact member 4 and the movable contact member 5, and either one of the SMA torsion springs is energized according to the polarity of the power supply connected via the movable contact members 4 and 5.

The first and second SMA torsion springs 6 and 7 are those in which coils having conductivity are wound in a different direction from each other (in opposite directions), which are wound from a state of an original angle 0° to a specified angle (for example, 90°) by applying a pre-load, and which are unwound to recoil by electrical heating of one of the torsion springs, meanwhile the other that is not energized is wound to a specified angle.

Normally (when not operating), the first SMA torsion spring 6 and the second SMA torsion spring 7 are in a non-heated state (refer to FIG. 2a), and if the first SMA torsion spring 6 is set to be unwound in a direction in which the inner drum 2 is rotated to the right (clockwise) when the first SMA torsion spring 6 is electrically heated (refer to FIG. 2b), the second SMA torsion spring 7 is unwound in a direction in which the inner drum 2 is rotated to the left (counterclockwise) by electrically heating the second SMA torsion spring 7 while the first SMA torsion spring 6 is in a non-heated state (refer to FIG. 2c).

In addition, as clearly shown in FIG. 3, a concave portion 1a and a concave portion 2a with which part of the movable contact members 4 and 5 are selectively engaged are each formed at equally spaced positions on the inner periphery of the outer cylinder 1 and the outer periphery of the inner drum 2 in a manner so as to face each other.

The movable contact members 4 and 5 provided between the concave portions 1a and the concave portions 2a between the outer cylinder 1 and the inner drum 2 have movable cylinders 4a and 5a constructing switching means for selectively energizing the first and second SMA torsion springs 6 and 7 according to the rotating position of the inner drum, which have base portions 4c and 5c in which ends of the first and second SMA torsion springs 6 and 7 are retained at the center thereof. The base portions 4c and 5c are restrained so as to move on a circular orbit L shown by a dotted line in the drawing while maintaining the orientation of the movable contact members 4 and 5 so that they always move in the radial direction. The restraining structure is not shown in the drawing, however, structures such as those in which the base portions 4c and 5c are guided while maintaining a specified orientation on the guide surface or in the guide groove along the circular orbit can be adopted.

The movable cylinders 4a and 5a are disposed in a manner so as to reciprocate in the radial direction with respect to the outer cylinder 1 and the inner drum 2 without interfering with the base portions 4c and 5c. In the movable cylinder 4a, a pair of SMA coil springs 4b and 4d exhibiting a shape memory effect are arranged on both sides of the base portion 4c and also, in the movable cylinder 5a, a pair of SMA coil springs 5b and 5d are disposed on both sides of the base portion 5c. The SMA coil springs 4b, 4d, 5b and 5d are conductive coils which are wound spirally, to which a pre-load is applied in the axial direction to be compressed, and which are extended and recoiled by electrical heating to compress another SMA coil spring and to move the movable cylinder in the extending direction, thereby engaging the ends in the moving direction with the concave portions 1a and 2a.

The base portion 4c in the movable contact member 4 is connected to an anode, and the base portion 5c in the movable contact member 5 is connected to a cathode. In addition, these base portions are connected to the first and second SMA torsion springs 6 and 7 while being electrically isolated. The movable cylinders 4a and 5a have contacts each electrically connected to a conductive bar when reaching the positions facing the concave portions 1a and 2a.

Figure 5:
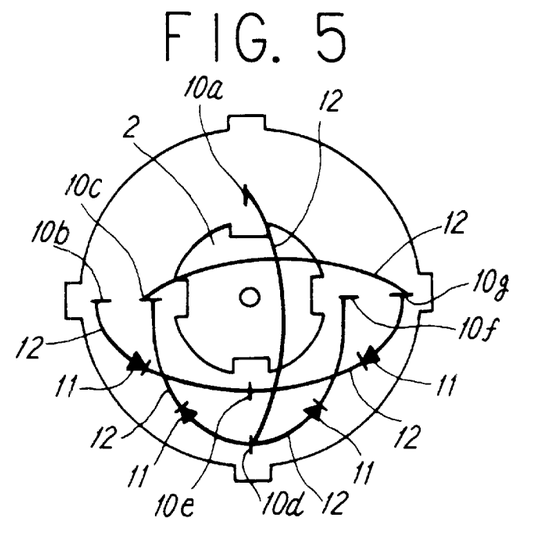
FIG. 5 is a view showing the wiring of a short-circuit line for the movable contact members of the continuous rotary actuator using the shape memory alloy of the embodiment according to the present invention.

That is, the SMA coil springs 4b and 4d have contacts 4e and 4f provided at both ends thereof and the SMA coil springs 5b and 5d have contacts 5e and 5f at both ends thereof. On the other hand, as shown in FIG. 5, a plurality of conductive bars 10a to 10g are disposed between the concave portions 1a of the outer cylinder 1 and the concave portions 2a of the inner drum 2, the conductive bars individually coming into contact with the contacts 4e and 4f and the contacts 5e and 5f and being electrically connected thereto. The conductive bars 10a to 10g are connected to each other with a short-circuit line 12 in which necessary diodes 11 are interposed as shown in the drawing.

Figure 4A:
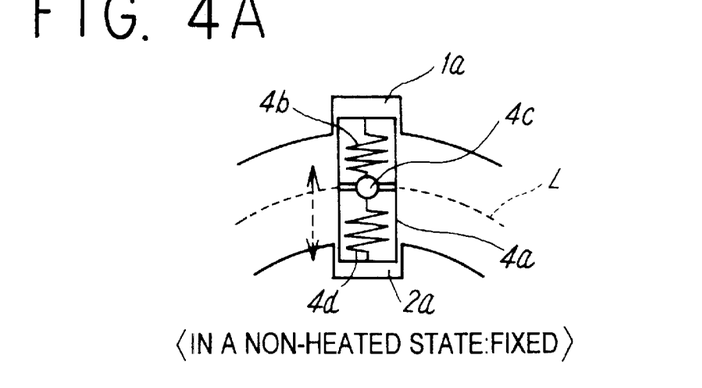
FIG. 4a is a view showing the state of the movable contact member of the continuous rotary actuator using the shape memory alloy of the embodiment according to the present invention when SMA coil springs are not heated.

The movable cylinder 4a of the SMA coil springs 4b and 4d in a non-heated state is engaged with both of the concave portion 1a and the concave portion 2a, and is locked (retained) so that the inner drum 2 does not rotate (refer to FIG. 4a). When the inner SMA coil spring 4d is electrically heated to extend, the movable cylinder 4a is moved to the inner drum 2 side, and the movable cylinder 4a is disengaged from the concave portion 1a of the outer cylinder 1 so as to be engaged only with the concave portion 2a (refer to FIG. 4b). In addition, when the outer SMA coil spring 4b is electrically heated to extend, the movable cylinder 4a is moved to the outer cylinder 1 side, and the movable cylinder 4a is disengaged from the concave portion 2a so as to be engaged only with the concave portion 1a (refer to FIG. 4c).

Figure 4B:
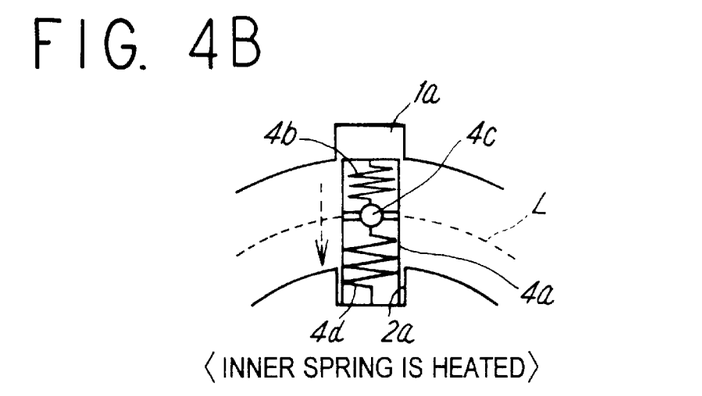
FIG. 4b is a view showing the state of the movable contact member when the inner SMA coil spring is heated.
Figure 4C:
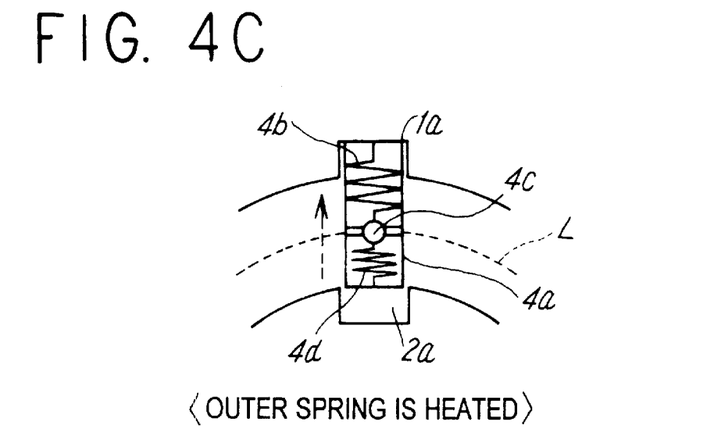
FIG. 4c is a view showing the state of the movable contact member when the outer SMA coil spring is heated.

Also with respect to the movable cylinder 5a, the same operation as that of the movable cylinder 4a is conducted.

Subsequently, the operation of the continuous rotary actuator having the foregoing structure will be described hereinbelow with reference to FIGS. 5 and 6.

Figure 6A:
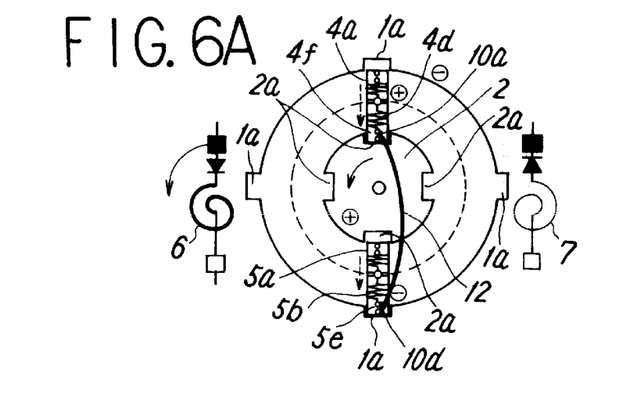
FIGS. 6a to 6d are explanatory views of the operation of the continuous rotary actuator using the shape memory alloy of the embodiment according to the present invention.

First, in a state in which the movable cylinders 4a and 5a are at the positions in FIG. 6a, the contact 4f in the movable cylinder 4a comes into contact with the conductive bar 10a, and the contact 5e in the movable cylinder 5a comes into contact with the conductive bar 10d, and consequently, the circuit comprising the base portion 4c, the SMA coil spring 4d, the short-circuit line 12 connecting the conductive bars 10a and 10d, the SMA coil spring 5b, and the base portion 5c is closed.

Consequently, the SMA coil spring 4d and the SMA coil spring 5b are electrically heated to extend, the movable cylinder 4a is moved to the inner drum 2 side to be engaged with the concave portion 2a, and the movable cylinder 5a is moved to the outer cylinder 1 side to be engaged with the concave portion 1a.

In this way, the circuit comprising the inner drum 2, the movable cylinder 4a, the first and second SMA torsion springs 6 and 7, the movable cylinder 5a, and the outer cylinder 1 is closed, however, only the first SMA torsion spring 6 is electrically heated due to the reverse-bias characteristic of the first diode 8.

Figure 6B:
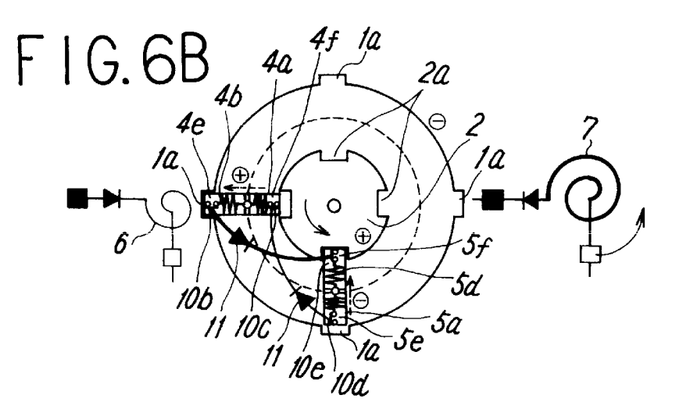

Therefore, the first SMA torsion spring 6 is unwound to 0° while rotating the inner drum 2 counterclockwise through 90°, the second SMA torsion spring 7 is wound counterclockwise through 90°, and the movable cylinder 4a is rotated and moved counterclockwise through 90° according to the rotation of the inner drum 2 (refer to FIGS. 6a and 6b).

Next, since the contacts 4e and 4f come into contact with the conductive bars 10b and 10c by the movement of the movable cylinder 4a, respectively, and the contacts 5e and 5f in the movable cylinder 5a come into contact with the conductive bars 10d and 10e, respectively, the circuit comprising the base portion 4c, the SMA coil spring 4b, the short-circuit line 12 connecting the conductive bars 10b and 10e, the SMA coil spring 5d, and the base portion 5c is closed. In addition, the diode 11 is interposed at the short-circuit line 12 connecting the conductive bar 10c with which the contact 4f of the movable cylinder 4a comes into contact and the conductive bar 10d with which the contact 5f of the movable cylinder 5a comes into contact, and thereby the short-circuit line 12 is not energized due to the reverse-bias characteristic of the diode 11. Therefore, the SMA coil springs 4b and 5d are electrically heated to extend, the movable cylinder 4a is engaged with the concave portion 1a, and the movable cylinder 5a is engaged with the concave portion 2a.

Consequently, the circuit comprising the inner drum 2, the movable cylinder 5a, the first and second SMA torsion springs 6 and 7, the movable cylinder 4a, and the outer cylinder 1 is closed, however, only the second SMA torsion spring 7 is electrically heated due to the reverse-bias characteristic of the second diode 9.

Accordingly, the second SMA torsion spring 7 is unwound to 0° while rotating the inner drum 2 counterclockwise through 90°. At the same time, the first SMA torsion spring 6 is wound counterclockwise through 90°, and the movable cylinder 5a is rotated and moved counterclockwise through 90° according to the rotation of the inner drum 2 (refer to FIGS. 6b and 6c).

Figure 6C:
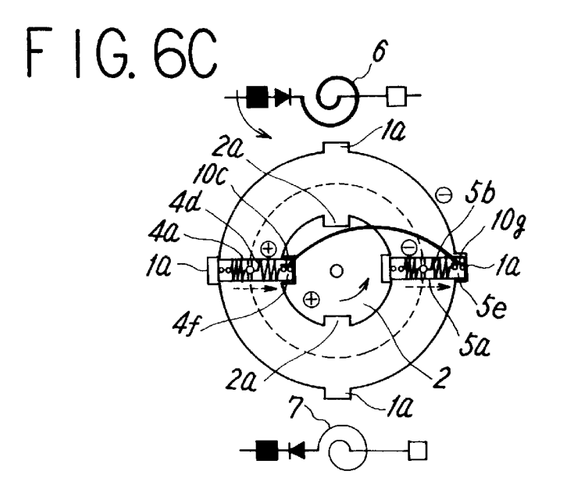

Subsequently, since the contact 5e comes in contact with the conductive bar 10g by the movement of the movable cylinder 5a, the circuit comprising the SMA coil spring 4d, the short-circuit line 12 connecting the conductive bars 10c and the 10g, and the SMA coil spring 5b is closed, the SMA coil springs 4d and 5b are electrically heated to extend, the movable cylinder 4a is engaged with the concave portion 2a, and the movable cylinder 5a is engaged with the concave portion 1a. In addition, the other short-circuit lines 12 connected to the conductive bars 10f and 10g with which the contacts 5e and 5f come into contact are not energized.

Consequently, the circuit comprising the inner drum 2, the movable cylinder 4a, the first and second SMA torsion springs 6 and 7, the movable cylinder $^5a$, and the outer cylinder 1 is closed, however, only the first SMA torsion spring 6 is electrically heated due to the reverse-bias characteristic of the first diode 8.

Figure 6D:
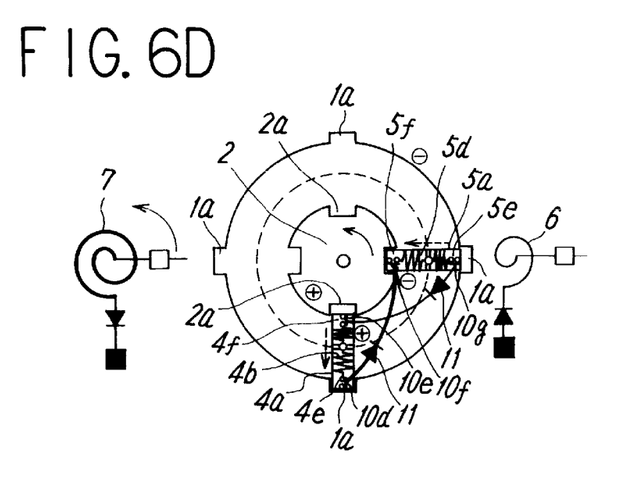

Therefore, the first SMA torsion spring 6 is unwound to 0° while rotating the inner drum 2 counterclockwise through 90°, the second SMA torsion spring 7 is wound counterclockwise through 90°, and the movable cylinder 4a is rotated and moved counterclockwise through 90° according to the rotation of the inner drum 2 (refer to FIGS. 6c and 6d).

Next, since the contacts 4e and 4f come into contact with the conductive bars 10d and 10e, respectively, by the movement of the movable cylinder 4a and the contacts 5e and 5f in the movable cylinder 5a come into contact with the conductive bars 10g and 10f, respectively, the circuit linking the SMA coil spring 4b, the short-circuit line 12 connecting the conductive bars 10d and 10f, and the SMA coil spring 5d is closed, and the circuit comprising the SMA coil spring 4d, the circuit line 12 connecting the conductive bars 10e and 10g, and the SMA coil spring 5b is closed. However, only the SMA coil springs 4b and 5d are electrically connected to extend due to the reverse-bias characteristic of the diode 11, so that the movable cylinder 4a is engaged with the concave portion 1a and the movable cylinder 5a is engaged with the concave portion 2a.

Consequently, the circuit comprising the inner drum 2, the movable cylinder 5a, the first and second SMA torsion springs 6 and 7, the movable cylinder 4a, and the outer cylinder 1 is closed, however, only the second SMA torsion spring 7 is electrically heated due to the reverse-bias characteristic of the second diode 9.

Accordingly, the second SMA torsion spring 7 is unwound to 0° while rotating the inner drum 2 counterclockwise through 90°. At the same time, the first SMA torsion spring 6 is wound counterclockwise through 90°, and the movable cylinder 5a is rotated and moved counterclockwise through 90° according to the rotation of the inner drum 2 (refer to FIGS. 6d and 6a). Hereinafter, the above-described operations are repeatedly performed so that the inner drum 2 is continuously rotated.

In this way, in the continuous rotary actuator of the present embodiment, since the first and second SMA torsion springs 6 and 7 are alternately electrically heated, the continuous rotation can be performed due to the larger rotation torque than that of a two-directional SMA.

In addition, since the spring constant of the first and second SMA torsion springs 6 and 7 is inversely proportional to the number of windings, high output can easily be realized by decreasing the number of winding of the springs and by increasing the rigidity of the springs structurally.

In addition, the high output can be also realized by using Ti—Ni—Cu SMA as the first and second SMA torsion springs 6 and 7, in which the rigidity during heating becomes much larger than that when there is no heating.

Furthermore, by alternately electrically heating the first and second SMA torsion springs 6 and 7, the response becomes fast, and the drawback of the SMA such that the response is slow can be overcome.

Also, by exchanging the potentials + and − of the outer cylinder 1 and the inner drum 2 and the movable cylinders 4a and 5a, clockwise/counterclockwise rotation becomes possible, and moreover, since the pair of first and second SMA torsion springs in which only the winding direction is different form each other are used, both of clockwise rotation and counterclockwise rotation cause the same output torque to be generated.

Also, when no current is applied, since the movable cylinders 4a and 5a are engaged with both of the concave portion 1a of the outer cylinder 1 and the concave portion 2a of the inner drum 2, the inner drum 2 can be fixed and locked to the outer cylinder 1, and as a result, undesirable rotation of the continuous rotary actuator when no current is applied can be prevented.

One embodiment of the present invention was described specifically, however, the present invention is not limited to the continuous rotary actuator described in the foregoing embodiment, but many modifications are possible within the spirit of the claims of the present invention.

Figure 7:
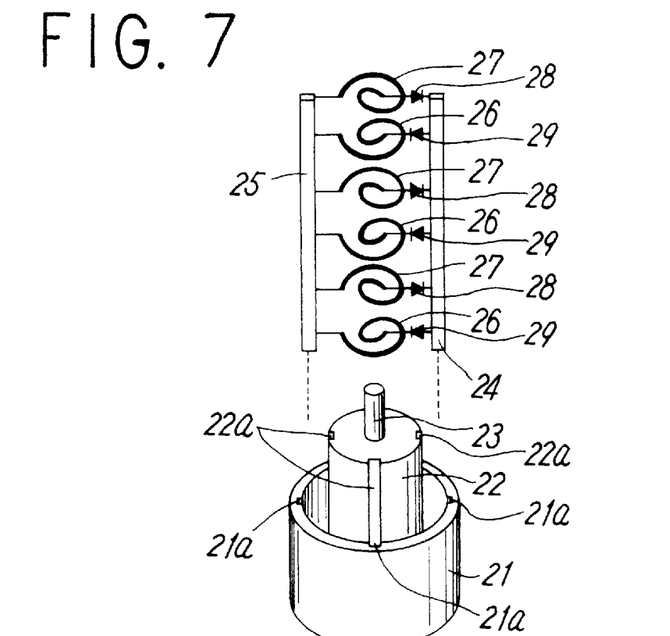
FIG. 7 is a perspective view showing the schematic structure of a continuous rotary actuator using a shape memory alloy of another embodiment according to the present invention.
Figure 8:
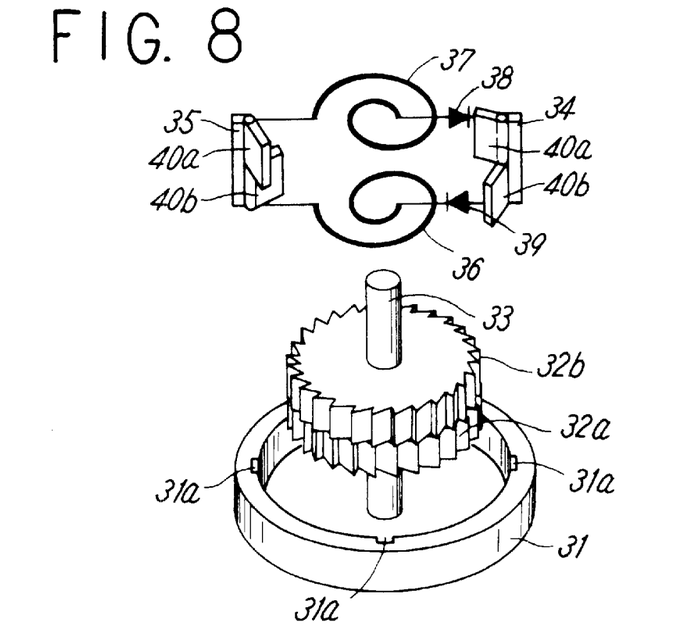
FIG. 8 is a perspective view showing the schematic structure of a continuous rotary actuator using a shape memory alloy of another embodiment according to the present invention.

For example, even the continuous rotary actuators having the structure shown in FIGS. 7 and 8 can demonstrate the same function as that of the continuous rotary actuator shown in FIGS. 1 to 6.

That is, the continuous rotary actuator shown in FIG. 7 has, in an outer cylinder 21, an inner drum 22 rotating around the axis as a rotating shaft 23, and a plurality of pairs of first and second SMA torsion springs 26 and 27 exhibiting the shape memory effect and which are wound in a different direction to each other are fixed to the outer cylinder 21 and the inner drum 22.

A concave portion 21a and a concave portion 22a are formed at equally spaced positions of the inner periphery of the outer cylinder 21 and the outer periphery of the inner drum 22, respectively. Movable contact members 24 and 25 for selectively energizing the first SMA torsion spring 26 and the second SMA torsion spring 27 are disposed between the outer cylinder 21 and the inner drum 22.

In addition, the first SMA torsion spring 26 and the second SMA torsion spring 27 are connected between the movable contact members 24 and 25 in parallel via a first diode 28 and a second diode 29 having a different directional characteristic from each other, respectively.

Since such a continuous rotary actuator has the plurality of pairs of first and second SMA torsion springs 26 and 27, the output is increased.

In addition, in a continuous rotary actuator shown in FIG. 8, ratchet gears 32a and 32b in the different direction from each other and rotating around the central axis as a rotating shaft 33 of an outer cylinder 31 are joined together in an outer cylinder 31, and a pair of first and second SMA torsion springs 36 and 37 exhibiting the shape memory effect, which are wound in the different directions from each other, are fixed to the outer cylinder 31 and the ratchet gears 32a and 32b via movable contact members 34 and 35.

Concave portions 31a are formed at the equally spaced positions of the inner periphery of the outer cylinder 31, and the movable contact members 34 and 35 for selectively energizing the first SMA torsion spring 36 and the second SMA torsion springs 37 are disposed between the outer cylinder 31 and the ratchet gears 32a and 32b.

The movable contact members 34 and 35 have two-way ratchets 40a and 40b, wherein the ratchet 40a is pressed to the ratchet gear 32b and the ratchet 40b is pressed to the ratchet gear 32a so as to be engaged therewith. During rotation of the continuous rotary actuator, any one of the ratchets 40a and 40b is engaged with the ratchet gears 32a and 32b and the other one slides, thereby not stopping the rotation.

Also, the first SMA torsion spring 36 and the second SMA torsion spring 37 are connected in parallel between the movable contact members 34 and 35, respectively, via a first diode 38 and a second diode 39 having a different directional characteristic from each other.

In this embodiment, the concave portions between the teeth in the ratchet gears 32a and 32b correspond to the concave portions 2a of the inner drum 2 in the above-described embodiment, and the ratchets 40a and 40b correspond to the engaging portions relative to the concave portions 2a in the movable contact members 4 and 5.

In addition, since the other structures of the continuous rotary actuator in FIGS. 7 and 8 are not substantially different to those described previously according to FIGS. 1 to 6, the description is omitted here.

As understood by the foregoing description, according to the present invention, the continuous rotary actuator using the shape memory alloy has a simple structure, which is small and lightweight, which can continuously rotate clockwise and counterclockwise, and in which the rigidity of the shape-memory-alloy torsion springs can be made larger, thereby the operating speed can be improved.

Also, since the structure is simple, a micro actuator can be constructed using the characteristic of the shape memory alloy that is useful for miniaturization by forming the diode as a microchip.

What is claimed is:

1. A continuous rotary actuator using a shape memory alloy, the continuous rotary actuator comprising:

an inner drum in an outer cylinder, the inner drum rotating around an axis, the axis constituted by a rotating shaft;

first and second movable contact members disposed between the outer cylinder and the inner drum so as to be able to rotate together with the inner drum;

first and second shape memory alloy torsion springs each having first and second ends attached to the first and second movable contact members, respectively, the first and second shape memory alloy torsion springs being wound in opposite directions from each other, wherein one of the first and second shape memory alloy torsion springs is unwound so as to recover a memorized shape thereof when subjected to electrical heating, and wherein another of the first and second shape memory alloy torsion springs is wound accordingly;

each of the first and second movable contact members being provided with an engaging member, the engaging members being freely engageable with the outer cylinder and the inner drum, wherein when the first and second movable members are engaged with either one of the outer cylinder or the inner drum, then the first and second movable members are not engaged with another of the outer cylinder or the inner drum, and wherein when one of the first and second movable contact members is engaged with the outer cylinder, then another of the first and second movable contact members is engaged with the inner drum;

switching means for alternately switching the electrical heating of the first and second shape memory alloy torsion springs and the first and second movable contact members at every rotation of the inner drum at a fixed angle, thereby continuously rotating the inner drum in one direction.

2. The continuous rotary actuator according to claim 1, wherein:

the outer cylinder and the inner drum are each connected to power supplies each having different electrodes, wherein the switching means is such that the first and second movable contact members engaged with the outer cylinder and the inner drum, respectively, can selectively energize the first and second shape memory alloy torsion springs according to an engaging state of the first and second movable contact members with the outer cylinder and the inner drum, respectively.

3. The continuous rotary actuator according to claim 2, further comprising diodes each having a different directional characteristic and each being connected to an energizing system of the first and second shape memory alloy torsion springs, thereby enabling either one of the first and second shape memory alloy torsion springs to be energized depending on a polarity of the power supplies connected to the outer cylinder and the inner drum via the first and second movable contact members.

4. The continuous rotary actuator according to claim 2, further comprising at least another pair of first and second movable members which are provide with another pair of first and second shape memory alloy torsion springs.

5. The continuous rotary actuator according to claim 1, further comprising diodes each having a different directional characteristic and each being connected to an energizing system of the first and second shape memory alloy torsion springs, thereby enabling either one of the first and second shape memory alloy torsion springs to be energized depending on a polarity of power supplies connected to the outer cylinder and the inner drum via the first and second movable contact members.

6. The continuous rotary actuator according to claim 1, wherein:

the switching means has a movable cylinder constituting the movable contact member, the movable cylinder enclosing first and second shape memory alloy coil springs in a manner so as to transform one of the first and second shape memory alloy coil springs according to a recoil of another of the first and second shape memory alloy coil springs due to the electrical heating, and the movable cylinder having contacts for applying current to the first and second shape memory alloy coil springs necessary for rotating the inner drum by coming into contact with conductive bars at engaging positions of the outer cylinder and the inner drum.

7. The continuous rotary actuator according to claim 6, further comprising diodes each having a different directional characteristic and each being connected to an energizing system of the first and second shape memory alloy torsion springs, thereby enabling either one of the first and second shape memory alloy torsion springs to be energized depending on a polarity of the power supply connected to the outer cylinder and the inner drum via the first and second movable contact members.

8. The continuous rotary actuator according to claim 6, further comprising concave portions, the movable cylinders being removably engaged with the concave portions in a manner so as to face each other at equally spaced positions of an inner periphery of the outer cylinder and an outer periphery of the inner drum.

9. The continuous rotary actuator according to claim 8, wherein the inner drum is formed by joining different directional ratchet gears, and wherein the inner drum has two-way ratchets engaging the concave portions between teeth of the ratchet gears.

10. The continuous rotary actuator according to claim 6, further comprising at least another pair of first and second movable members which are provide with another pair of first and second shape memory alloy torsion springs.

11. The continuous rotary actuator according to claim 1, further comprising at least another pair of first and second movable members which are provide with another pair of first and second shape memory alloy torsion springs.

* * * * *